No. 831,552. PATENTED SEPT. 25, 1906.
O. HALLSTROM.
FISH HOOK.
APPLICATION FILED APR. 5, 1905.
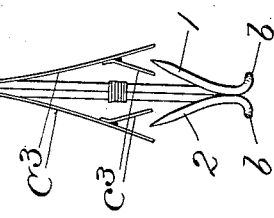
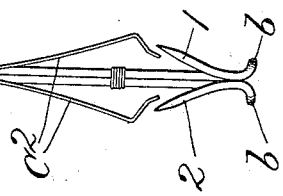
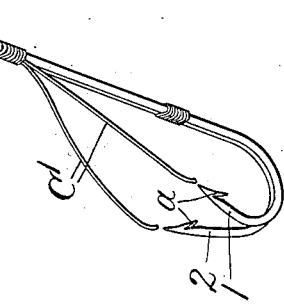
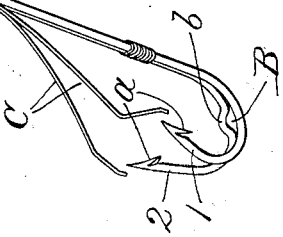
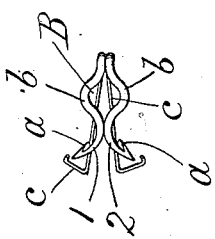
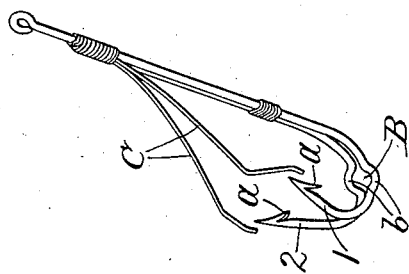
Witnesses.
Edward T. Wray.
Fred G. Fischer
Inventor.
Oscar Hallstrom
by Burton & Burton
his Atty's.

UNITED STATES PATENT OFFICE.

OSCAR HALLSTROM, OF CHICAGO, ILLINOIS.

FISH-HOOK.

No. 831,552.     Specification of Letters Patent.     Patented Sept. 25, 1906.

Application filed April 5, 1905. Serial No. 253,947.

*To all whom it may concern:*

Be it known that I, OSCAR HALLSTROM, a citizen of the United States, residing at Chicago, in the county of Cook and State of Illinois, have invented new and useful Improvements in Fish-Hooks, of which the following is a specification, reference being had to the accompanying drawings, forming a part thereof.

The purpose of this invention is to provide an improved form of fish-hook adapted to hold the bait in a more advantageous manner than heretofore and to become engaged with the mouth or throat of the fish more securely than the forms of fish-hook heretofore employed.

It consists of the features of construction set out in the claims.

In the drawings, Figure 1 is a perspective view of one form of my improved fish-hook. Fig. 2 is a bottom plan view of the same. Fig. 3 is a perspective view of a somewhat modified form. Fig. 4 is a perspective view of a second modification. Fig. 5 is a front elevation showing a modification of the weed-guard, which may be applied to any of the forms shown in the preceding figures. Fig. 6 is a view similar to Fig. 5, showing a further modification of the weed-guard, which is also applicable to any of the forms of hook shown.

My improved fish-hooks comprise in every form two terminals 1 and 2, each of which has a single barb $a$, said terminals being formed on two separate pieces of wire, which are secured together at the shank of the hook, but which are unattached throughout the entire hook portion and for a distance back therefrom along the shank, so that they are adapted to be sprung apart. The two terminals commence to diverge at the forward part of the hook and stand spread at an angle to each other from thirty to forty-five degrees. The intention of this construction, beside causing the hook to be more securely held in the mouth or throat of the fish, is to adapt the hook to hold the bait by the spring grip of the two parts, the bait being entered between the diverging terminals and drawn down between the wires and held by their grasp upon it at the points where they are separated by the thickness of the bait thus introduced between them. For accommodating larger bait, and particularly for such bait as small frogs or other live bait which should be left free to move so as to attract the fish, one or both of the wires may be bent outward at the bottom of the hook, as shown at $b$, forming an eye B between the two wires. In Fig. 3 I have shown one of the wires thus deflected, and in Figs. 1 and 2 both wires are shown deflected, making the eye B larger than in the other form. I combine with this double-terminal hook a weed-guard which may be in any one of the several forms illustrated. In the form shown in Fig. 1 the guard for each of the terminals consists of a spring-wire C, which is secured at the upper end of the shank and extends down forward to a point above and somewhat inward and forward of the extremity of the terminal, and from that point it is bent outward—that is, away from the plane which would bisect the stem and also the angle between the diverging terminals—and at the end is bent downward for a short distance outside the hook-terminal. The guard in this form is familiar as applied to a hook having a single terminal. In Fig. 4 I have shown a somewhat simpler form of guard in which the spring-wire C' is bent in a curve from its fastening at the upper end to the shank, so as to extend downward, forward, and outward and then downward, forward, and slightly inward and at the end a little backward, so as to terminate at a point very nearly overhanging the extremity of the hook-terminal. Each of the two terminals is similarly provided with such guard.

In connection with the hook shown in Fig. 5 there is illustrated a somewhat preferred form of weed-guard which differs from the first form above described in that the spring-wire $C^2$, after extending downward and forwardly and slightly outward to a point a little above and inward from the hook-terminals, is deflected inward, downward, and forward, so as to extend across above the extremity of the terminals and at its end is given a short bend forward and downward. This form tends somewhat more certainly than the preceding to deflect the weed away from the hook-terminals. A still more preferred form of weed-guard is shown in Fig. 6, in which the spring-wire $C^3$ is forked at the end, the two branches $c^3$ $c^3$ extending to opposite sides of the hook-terminal, the angle between them overhanging said terminal and both branches being in a vertical plane a little forward thereof.

I claim—

1. A fish-hook comprising two spring-wires rigidly connected at the shank or stem of the hook and free to be sprung apart from the point of such connection to the extremity, such wires being bent so as to normally stand apart at the bottom of the bend of the hook and converging thence to the forward side of said bend, and thence diverging from their point of nearest approach upwardly to the extremities.

2. A fish-hook comprising two spring-wires rigidly connected at the shank or stem of the hook and free to be sprung apart from the point of such connection to the extremity, said wires being near together at the forward side of the bend of the hook and diverging thence upwardly to the extremities.

3. A fish-hook comprising two spring-wires secured together at the shank of the hook, and elastically separable from thence onward to the extremity, the two wires being near together at the forward side of the bend of the hook and thence diverging upwardly to the extremities, one of said wires having a deflection outward at the bottom of the hook to form an eye between the two wires.

4. A fish-hook comprising two spring-wires secured together at the shank of the hook and elastically separable from thence onward to the extremity, the two wires being near together at the forward side of the bend of the hook and thence diverging upwardly to the extremities, said wires having each a bend outwardly at the bottom of the hook constituting mated recesses, to form an eye between the two wires at the bottom.

5. A fish-hook comprising two rigidly-connected wires having diverging terminals constituting the terminals of the hook, and weed-guards extending rigidly from the upper end of the shank overhanging the terminals respectively, and at their overhanging part extending obliquely in a plane transverse to a plane which bisects the shank and the angle between the diverging terminals.

6. A fish-hook comprising two members rigid with each other forming two diverging hook-terminals; a weed-guard comprising two spring-wires secured at the upper end of the shank, extending thence forwardly and downward to points respectively above the extremities of the hook-terminals, and deflected thence obliquely inward and downward, the oblique portion overhanging such terminals.

In testimony whereof I have hereunto set my hand, in the presence of two witnesses, at Chicago, Illinois, this 29th day of March, 1905.

OSCAR HALLSTROM.

In presence of—
  FREDK. G. FISCHER,
  J. S. ABBOTT.